4/10/84 XR 4,442,345

United States Patent [19]

Mollier et al.

[11] 4,442,345

[45] Apr. 10, 1984

[54] APPARATUS FOR AND METHOD OF RECYCLING RECORDING CARRIERS, SUCH AS CREDIT CARDS, INCLUDING NON-VOLATILE ERASABLE MEMORIES FOR IDENTIFICATION DATA

[75] Inventors: Jean H. Mollier, Bougival; Michel Ugon, Plaisir, both of France

[73] Assignee: CII Honeywell Bull, Paris, France

[21] Appl. No.: 517,981

[22] Filed: Jul. 29, 1983

Related U.S. Application Data

[63] Continuation of Ser. No. 340,523, Dec. 2, 1981, which is a continuation of Ser. No. 143,808, Apr. 23, 1980, abandoned.

[30] Foreign Application Priority Data

Apr. 25, 1979 [FR] France ............................ 79 10561

[51] Int. Cl.[3] ............................................ G06K 5/00

[52] U.S. Cl. .................................. 235/380; 235/375; 235/381; 235/382.5; 235/379

[58] Field of Search ............... 235/375, 441, 492, 494, 235/380, 381, 382, 382.5, 379

[56] References Cited

U.S. PATENT DOCUMENTS

| | | | |
|---|---|---|---|
| 2,734,954 | | Kidd | 200/46 |
| 2,792,148 | | Goldenberg | 222/2 |
| 2,914,746 | | James | 525/382 |
| 3,022,381 | | Pferd | 179/6.4 |
| 3,641,499 | 2/1972 | Housman | 340/149 |
| 3,702,464 | 11/1972 | Castrucci | 340/173 SP |
| 3,806,874 | | Ehrat | 340/149 R |
| 3,906,460 | 9/1975 | Halpern | 340/172.5 |
| 3,934,122 | 1/1976 | Riccitelli | 235/380 |
| 3,971,916 | 7/1976 | Moreno | 235/61.7 B |
| 4,001,550 | 1/1977 | Schatz | 235/61.7 B |
| 4,004,133 | 1/1977 | Hannan | 235/441 |
| 4,007,355 | 2/1977 | Moreno | 235/379 |
| 4,105,156 | 8/1978 | Dethloff | 235/441 |
| 4,204,113 | 5/1980 | Giraud | 235/375 |

*Primary Examiner*—Harold I. Pitts

*Attorney, Agent, or Firm*—Lowe, King, Price & Becker

[57] ABSTRACT

A credit card includes a memory having first and second zones in which are respectively stored variable and fixed data. The data stored in the first zone includes first, second and third bit fields respectively representing a card serial number, a card invalidation character and a card validation character. The first, second and third bit fields are subject to change by improper use of the card. The first, second and third bit fields are read to derive first, second and third signals. The second signal is compared with a predetermined signal indicative of a desired value for the second field. A set of bits is written into the third field in response to the second signal being equal to the predetermined signal and the first signal being equal to a stored signal indicative of an assigned serial number. The set of bits written into the third field is tested to determine if the bits were properly written into the third field. In response to the test on the third field indicating that the bits were properly written into the third field and the second signal being equal to the predetermined signal and the first signal being equal to a stored signal indicative of an assigned serial number, the variable data stored in the second part of the memory are changed.

9 Claims, 6 Drawing Figures

APPARATUS FOR AND METHOD OF RECYCLING RECORDING CARRIERS, SUCH AS CREDIT CARDS, INCLUDING NON-VOLATILE ERASABLE MEMORIES FOR IDENTIFICATION DATA

This application is a continuation of application Ser. No. 326,523 filed Dec. 2, 1981 which is a continuation of Ser. No. 143,808, filed Apr. 23, 1980, now abandoned.

FIELD OF THE INVENTION

The present invention relates to an apparatus for and method of permitting the reutilization or recycling of recording carriers, such as credit cards, identifiable by data recorded on the carriers in a non-volatile, erasable memory, and more particularly to such a recycling apparatus and method wherein signals derived by reading data from the memory are compared with signals from devices external to the memory, to enable variable data stored in the card memory to be changed.

BACKGROUND OF THE INVENTION

Non-volatile memories are capable of permanently retaining data contained therein, in the absence of external electric power. Exemplary of non-volatile memories are magnetic tapes, magnetic coil memories, bubble memories and semiconductor memories employing metal nitrite oxide silicon (MNOS) technoloy. Non-volatile memories are erasable by the action of electronic and, in some cases, radiant energy fields applied to elements in the memories. The non-volatile memories can hold a maximum amount of data, depending on the number of elementary cells included therein, which number defines the capacity of the memory. The capacity of a non-volatile memory limits the number of operations for which the memory can be used. When the amount of data stored in the memory reaches the memory capacity, the user of the memory has two options. In particular, he can stop using the memory and employ another memory having no data in it or he can consider erasing i.e., changing, the portion of the memory where changeable data are stored, to make that portion of the memory available for reuse.

In many applications, data stored in a non-volatile memory is of no further use after a significant number of additional operations have been performed on the memory. In such instances, it is far preferably to erase or change the contents of the memory, in contrast to obtaining a new memory. In memories that are mounted on credit cards, erasure of the memory is preferable to replacement. In the credit card application, however, it is imperative that changing the data stored in memory can only be performed with authorization from the credit card issuing agency. Otherwise, the credability of systems using the credit cards would be virtually destroyed. It is thus apparent that holders of credit cards containing electronic memories cannot be allowed to modify or erase any of the changeable data that might be stored therein.

It is, therefore, an object of the present invention to provide an apparatus for and method of enabling erasure of non-volatile memories only under certain conditions.

Another object of the invention is to provide an apparatus for and method of erasing non-volatile credit card memories in such a manner that the holder of a credit card cannot erase or change data in the memories without affecting the validity of the credit card.

BRIEF DESCRIPTION OF THE INVENTION

According to the present invention, memories included on recording carriers, such as credit cards, can be changed only by a private or administrative service authorized to make such erasures or changes. The changes can be performed only in a private or administrative service authorized to perform the changes because precautions must be taken that the holders of the credit cards do not alter the contents of the memories. Otherwise, unscrupulous holders of the credit cards are liable to alter the contents of the cards and change signals representing things such as credit balance, credit authorization, expiration date and/or establishments where the cards can be used.

Non-volatile erasable monolithic memories are frequently sensitive to certain external physical disturbances. For example, memories constructed of MNOS elements can have the signals stored therein altered by exposure to electromagnetic, principally ultraviolet, radiation that can modify the amplitude of distributed electric charges. For example, a stored data word having M binary bits, of which N are in a binary one state and the (M-N) remaining bits are in the zero state, can be modified in response to exposure to ultraviolet radiation. Such exposure can modify the word so that $N+q$ bits are in the one state and the remaining $M-(N+q)$ remain in the zero state.

Changes in the binary data stored in a non-volatile erasable monolithic MNOS memory can also occur in response to repeated access to the memory because repeated access progressively reduces the amount of stored charge. Also, defects in current or voltage generators supplying the memories with data can disturb and modify the stored data.

Numerous devices can be used to maintain the accuracy of the stored data. Absorption screens can be arranged between the memory elements and radiation sources to prevent alteration of the stored data. The stored data accuracy can also be maintained by cyclically regenerating stored electric quantities, such as electric charges, in MNOS memories. Security devices can also be provided to prevent defective electric energy sources from being coupled to memories.

An alternative apparatus and method for maintaining the accuracy of the stored data involves providing a control character which changes state in response to the memory being exposed to external physical disturbances. Such devices are disclosed in the co-pending, commonly assigned applications of Jean H. Mollier, entitled Method of and Apparatus for Testing a Memory Matrix Control Character, Ser. No. 06/108335, now U.S. Pat. No. 4,319,355 and Jean H. Mollier, entitled Method of and Apparatus for Enabling a Determination to be Made of Undesirable Changes to a Memory Matrix, Ser. No. 06/108337, now U.S. Pat. No. 4,344,155. Utilizing a control character, as described in the co-pending applications, enables non-volatile erasable memories to be as secure as read only (ROM) memories, where data are written into the memory irreversibly. Semiconductor diode memories are examples of irreversible read only memories because data elements are stored by severing a junction separating N and P semiconductor zones forming a diode.

The apparatus and method according to the present invention must be capable of functioning with recording carriers, i.e., credit cards, having the previously mentioned safety factors. To erase or change data stored in the credit card memory, the credit card is handled by personnel trained to supply binary enabling signals to the memory for the changes. The enabling binary data are compared, within the recycling device, with data stored within the memory of the credit card, to enable the recycling device determine the true identity of the credit card. The credit card identity is indicated by a serial number which is designated during the credit card manufacturing process or by an identification key which is given on delivery to its owner. The identity of the credit card is also indicated by a validation character which enables the recycling device to recognize that all data within the credit card are correct. A combination of these factors can also be employed to enable the recycling device to change or erase data in the credit card memory.

The credit card memory can be thought of as including first and second zones which respectively store fixed and variable data. Examples of the variable data are maximum authorization limits, credit balance, expiration date and establishments where the credit card can be used. In the first zone, the fixed data are stored in a plurality of bit fields. First and second of the bit fields respectively represent the card serial number and a card invalidation character. The bit fields in the first zone are subject to change by improper use of the card, in contrast to the data in the second zone which are likely to be changed as the card is used, e.g., because credit balance varies.

To prevent fraudulent use of the card, a recycling apparatus according to the invention erases or changes data stored within a recording carrier, i.e., credit card, only when the apparatus determines that the card has not been improperly used through testing of the invalidation character and checking of the serial number on the card. The apparatus includes means for reading and interrupting identification data in the first zone of the card, to enable erasure of data stored in the second zone of the card. The apparatus also includes means for writing a validation code into another bit field of the credit card memory first zone, to make the credit card suitable for other operations, when an erasing or changing operation has been authorized by the data identification interruption means. The first and second bit fields of the card, associated with the card serial number and a card invalidation character, are read to derive first and second signals. The second signal is compared with a predetermined signal indicative of a desired value for the second signal. The first signal is compared with stored signals indicative of serial numbers assigned to a set of credit cards. In response to the second signal being equal to the predetermined signal and the first signal being equal to a stored signal indicative of an assigned serial number, the variable data stored in the first part of the memory are erased, i.e., changed.

According to a further feature, the credit card memory first zone includes a third bit field representing a card validation character. In response to the second signal being equal to the predetermined signal and the first signal being equal to a stored signal indicative of an assigned serial number, a set of bits is written into the third field. Then the set of bits written into the third field is tested to determine if the bits were properly written into the third field. In response to the test on the third field indicating that the bits were properly written into the third field and the second signal being equal to the predetermined signal and the first signal being equal to a stored signal indicative of an assigned serial number the variable data stored in the first part of the memory are changed.

In accordance with a further aspect of the invention, a particular code is provided for the writing of identification data into certain bit fields of zone one of the credit card, particularily the validation and/or validation fields. In particular, an N amongst M code is employed for one or both of these fields where N represents a predetermined number of binary elements having a predetermined state, either binary one or binary zero, in a data field having M bits. By employing an N amongst M code, the recycling device can easily detect an attempt at changing or erasing the changeable data in the credit card. Such an attempt to change results in a modification of the N amongst M code whereby the number N of predetermined binary elements in the bit field deviates from the predetermined number. The interpreting means detects whether the field conforms to the N amongst M rule. If the field does not conform to the N amongst M rule, an invalidation character is written into the card memory so that the number N is increased to N+q. Increasing the number of predetermined binary elements in the identification field from N to N+q prevents the credit card from being utilized. One particular advantageous code which can be utilized for establishing N+q binary elements in the identification field involves an alternating series of zeros and ones.

One particular embodiment of the invention involves inviability of data contained in the card memory, a result obtained by incorporating control and addressing circuitry for the credit card memory within the credit card.

Without the previously mentioned precautions, an unscrupulous person holding a credit card could, by simply monitoring signals exchanged between the recycling machine and the credit card memory, recognize the nature of the stored data and the conditions necessary to erase or change the stored data and the validation code of the credit card for different usages. Incorporating a controller in the credit card constitutes an insurmountabale physical obstacle because the sequential control operations occur entirely within the credit card without an external medium knowing or being able to discover the nature of the signals transmitted between a reading device and the credit card. Internal incorporation of the control means within the credit card enables internal tests of the validity of keys which order the erasing to be performed. If the internal test is negative, the invalidation bit field is altered by the control means so that the invalidation field never returns to its original state. Because the invalidation field does not return to its original state, further use of the credit card is prevented. Incorporating the control means in the credit card prevents any further use of the credit card by controlling the invalidation bit field so it has a new value.

The above and still further objects, features and advantages of the present invention will become apparent upon consideration of the following detailed description of several embodiments thereof, especially when taken in conjunction with the accompanying drawing.

DETAILED DESCRIPTION OF THE DRAWING

Figure 1:
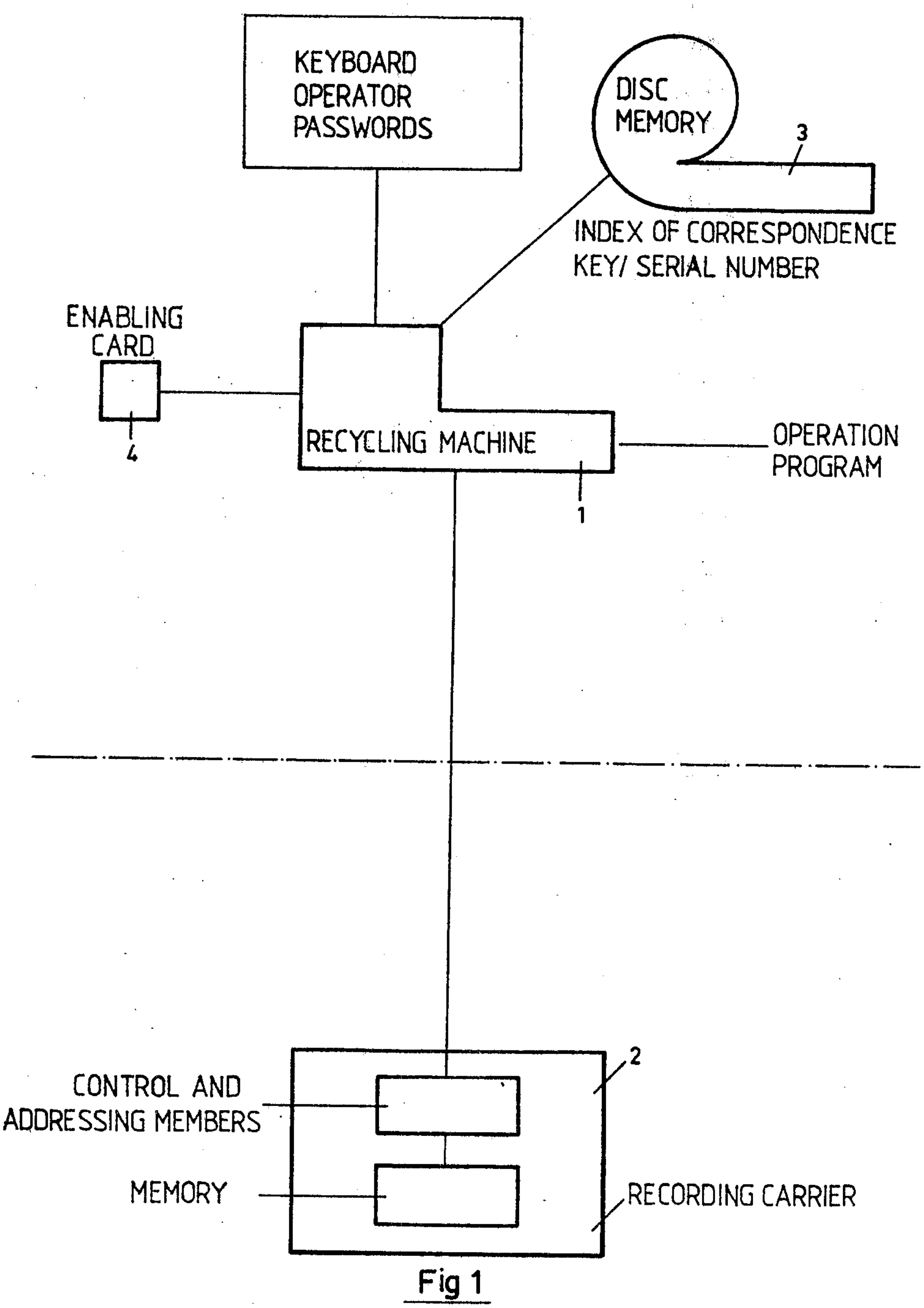
FIG. 1 is a simplified block diagram of an apparatus for enabling a recording carrier, i.e., credit card, to be reutilized or recycled in accordance with the invention.

Reference is now made to FIG. 1 of the drawing wherein there is illustrated a recycling machine 1 cooperating with a recording carrier 2, i.e., credit card, having a nonvolatile erasable monolithic memory which stores data which are to be erased or changed and validated for other purposes. Recycling machine 1 also cooperates with a disk memory 3 which contains indices between identification codes and credit card seial numbers; the credit card serial numbers are stored within the memory of credit card 2. Recycling machine 1 also cooperates with enabling card 4, in the possession of an operator authorized to perform recycling operations on card 2. Enabling card 4 includes a memory in which are recorded binary bits representing an identification code. Each serial number of all credit cards 2 in a set of credit cards is stored in index or disk memory 3. Each serial number corresponds to a particular credit card 2 in the set of credit cards. Each credit card, when coupled to a holder or reader (not shown) therefor is supplied with another identification code or a key from the apparatus cooperating with recycling machine 1. Thus, each serial number stored in disk memory 3 corresponds to an identification code or a key for a particular credit card 2 in the set of credit cards. The key serial number correlation is recorded in disk memory 3. Memory 3 can be any suitable form of mass storage device, such as a magnetic tape, magnetic drum, as well as a magnetic disk.

Recycling of credit card 2 can begin when the apparatus associated with recycling machine 1 has verified that the operator of the equipment associated with the recycling machine is authorized to perform a recycling operation. To this end, the operator must introduce into the apparatus associated with recycling machine 1 an operating card containing the operator's identification card. The identification code is entered simultaneously with the operator typing a password or identification code on a keyboard 5. Signals read from the enabling card 4 and keyboard 5 are supplied to recycling machine 1, together with signals from memory 3 and credit card 2, to enable the recycling machine to erase data stored in the card memory, as well as to enable the card memory to store signals which enable the card to be properly used during normal operation by the card holder.

If the relationship between the identification code in the memory on card 2 and the password typed on keyboard 5 by the operator of recycling machine 1 is correct, signals from enabling card 4 supply data necessary for recycling to machine 1, and enable the recycling machine to communicate new data to the memory of card 2.

In one preferred embodiment, enabling card 4 is a simple magnetic card, as commonly employed in present day credit cards having a magnetic strip. Alternatively, enabling card 4 can include a semiconductor memory of the Read Only Memory (ROM) or Programmable Read Only Memory (PROM) type. In a more complex version, enabling card 4 can be provided with programmed control circuitry.

Verification of the identities of the operator for a keyboard 5 and the code of credit card 2 to be erased, as well as of the erasure operation on the memory of card 2 and validation of card 2 for reuse, necessitates execution of a series of operations between recycling machine 1 and card 2. This series of operations is executed sequentially by means of sequential electronic circuits or by prior art structures, such as presently available microprocessors to which are added an operation program. If a microprocessor is employed, one preferred microprocessor is an Intel 880 microprocessor. An embodiment of the recycling machine 1 using a microprocessor for controlling the sequential operations is illustrated in FIG. 2.

Figure 2:
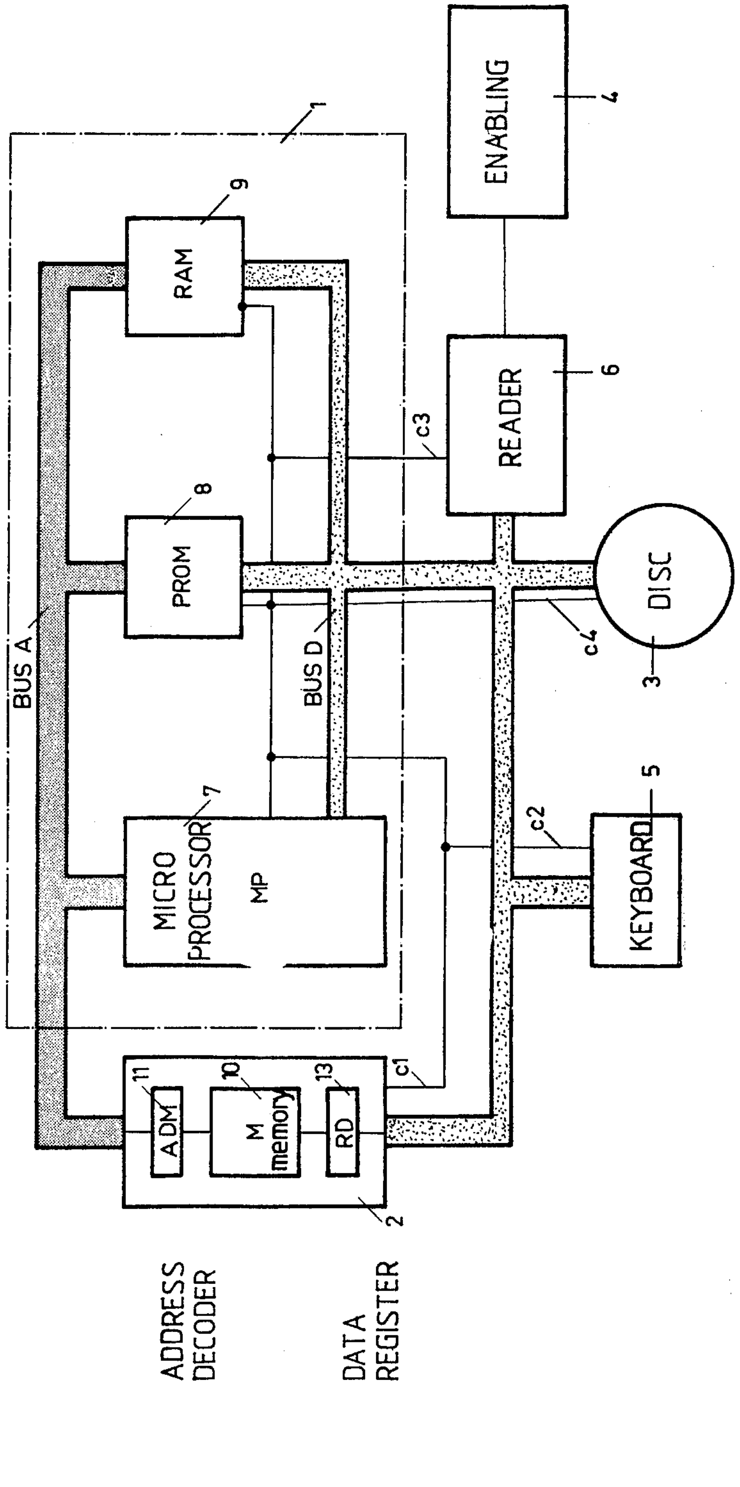
FIG. 2 is a more detailed block diagram of apparatus for recycling a credit card.

Reference is now made to FIG. 2 of the drawing wherein recycling machine 1 is illustrated as including microprocessor 7, in combination with programmable read only memory (PROM) 8 and random access, read/write memory (RAM) 9. Random access memory 9 is capable of being erased, so that it is possible to read and rewrite all or part of the data contained therein. In contrast, read only memory 8, after being initially programmed, is not erasable and the data stored therein can only be read.

Microprocessor 7, PROM 8 and RAM 9 are interconnected with disk memory 3, containing serial numbers, keyboard 5, responsive to operator password input signals, and card reader 6 responsive to stored signals on enabling card 4. Disk memory 3, keyboard 5 and card reader 6 are interconnected with microprocessor 7, PROM 8 and RAM 9, as well as credit card, 2 by a 16 bit data bus D, as well as by a control bus C, including leads c1, c2, c3; bus C includes additional leads which are interconnected in microprocessor 7, as described infra.

Figure 3:
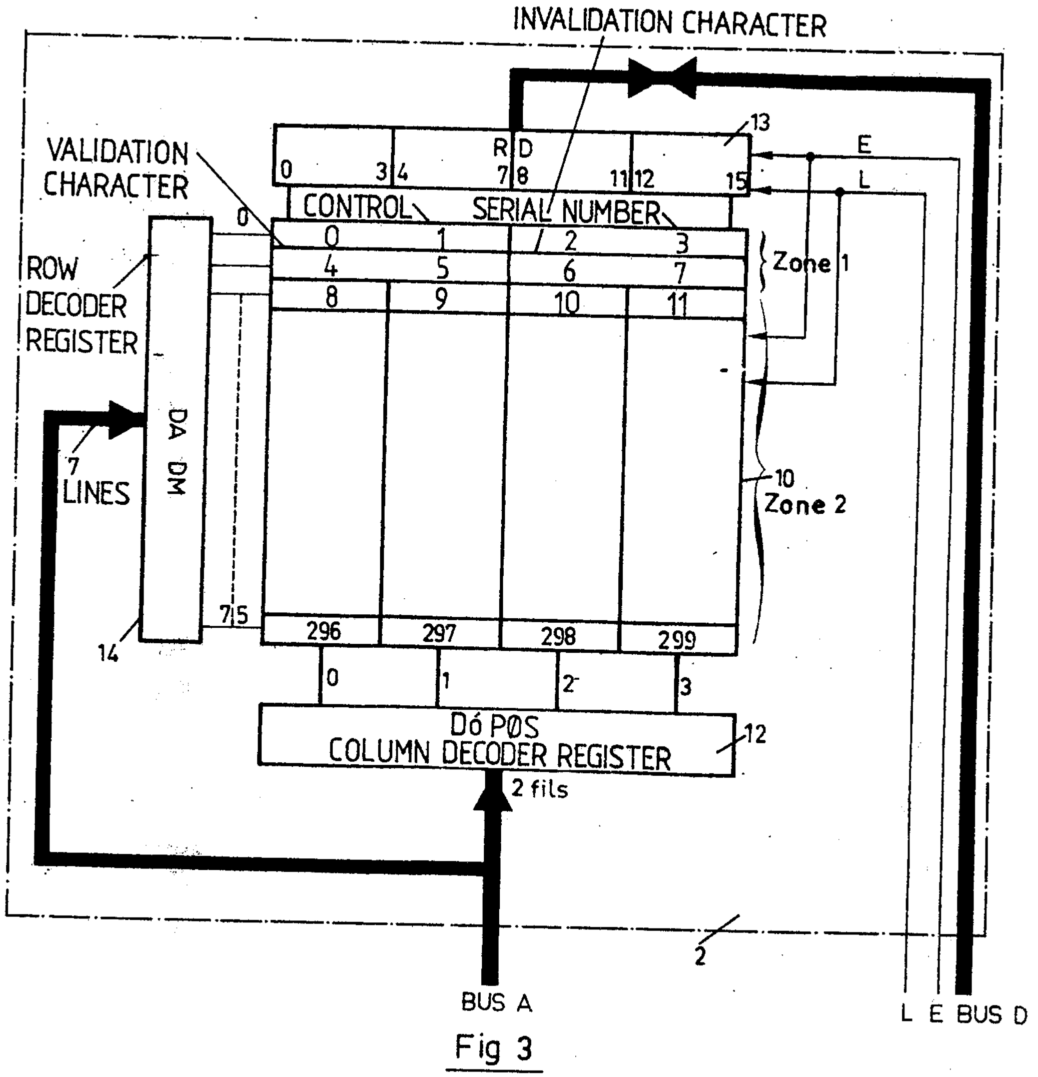
FIG. 3 is a diagram of a credit card utilized in accordance with one preferred embodiment of the present invention.

As specifically illustrated in FIG. 3, credit card 2 includes a non-volatile erasable monolithic memory 10 which is addressed in response to signals derived from address decoder AMD 11. Signals written into and read from memory 10 are supplied to 16 bit data bus D by way of data register RD 13. Address decoder 11 and data register 13, as well as memory 10, are incorporated within credit card or recording carrier 2.

PROM 8, RAM 9, and memory 10 on credit card 2 are addressed by a signal derived from microprocessor 7 by way of 9 bit address bus A. Microprocessor 7 supplies various orders or commands to credit card 2, disk memory 3, keyboard 5, card reader 6, PROM 8 and RAM 9 by way of command bus CO, which includes a number of branches c1, c2, c3 and c4 which are respectively connected to card 2, keyboard 5, card reader 6 and disk memory 3. Details of credit card 2 and microprocessor 7 are described infra in connection with FIGS. 3 and 4.

Reference is now made in greater detail to FIG. 3 wherein the organization of memory 10 in credit card 2 is illustrated. Memory 10 is a non-volatile, erasable memory, preferably manufactured in metal nitride oxide semiconductor (MNOS) technology, enabling data to be stored therein for a very long interval (years) without being altered by leakage. The elements of memory 10, however, can be erased at will, either entirely or in segments as small as one four bit word at any time. Memory 10 contains 300 words, each including 4 bits, arranged as a matrix including 76 rows and 4 columns, such that one 4 bit word is included in each column or position on each row. Each word is situated at the intersection of a row and column, with the words being addressed in the memory at addresses numbered from 0 to 299. Memory 10 is arranged so that row 0 includes words 0–3, row 1 includes words 4–7, row 2 includes words 8–11, etc. . . . line 75 includes words 296–299.

Memory 10 is addressed by supplying a 9 bit addressing word, coded in natural binary form, to bus A. The two least significant bits applied to address bus A are supplied to location decoder DoPOS 12, while the seven most significant bits on bus A are supplied to address decoder DA ADM 11. The two least significant bits supplied by bus A to decoder 12 enable one of columns 0–3 to be selected, while the seven most significant bits supplied to decoder 11 enable one of rows 0–75 to be selected. The selected row and column combination enables a word to be written into or read from a selected word location in the memory.

To read information from memory 10 and write information into the memory, binary one levels are respectively applied to leads L and E. Leads L and E are connected to control inputs of memory 10 at 16 bit data register RD 13. Data register 16 is, in essence, a buffer register between 16 bit data bus D and memory 10. A data word coupled between bus D and an address in memory 10 is stored in data register 13.

Each bit position in data register 13 corresponds with one of the columns in memory 10. Data register 13 is arranged so that bit positions 0–3 thereof store the words read from and written into column 0; bit positions 4–7 of register 13 store the word written into and read from column 1 of memory 10; bit positions 8–11 of memory 13 store the words written into and read from column 2 of memory 10; and bit positions 12–15 of register 13 store the words written into and read from column 3. In response to a binary one signal being applied to write lead E simultaneously with binary one signals being applied by decoders 11 and 12 to row P and column Q, the word stored in the Q position of register 13 is written into row P of memory 10; similarly, in response to a binary one signal being applied to read lead L simultaneously with activation of row P and column Q by decoders 11 and 12, the word in memory 10 at the intersection between column Q and row P is supplied to the Q position in data register 13.

Memory 10 is organized into a pair of zones, designated as zones 1 and 2. Zone 1 contains all characteristics which are essential to identify credit card 2 for normal utilization or during recycling, in connection with recycling machine 1. Zone 2 of memory 10 is a working zone reserved for storage of data collected during normal use of credit card 2; exemplary of data stored in zone 2 are an authorization limit of the card holder, establishments where the card can be utilized, existing credit balance, and expiration data of the card. During a recycling operation all data stored in zone 2 are changed, preferably by erasure and rewritting.

Zone 1 is divided into four spaces or bit fields, each of which includes two words. In the first bit field in zone 1 (words zero and one respectively located at row 0, column 0 and row 0, column 1) is stored a control character. The contents of the first bit field are detected during multiple uses of credit card 2 to assure that memory 10 has not been disturbed by external physical phenomenon as described in the previously mentioned, co-pending applications. The second bit field in zone 1 (words two and three respectively addressed by row 0, column 2 and row 0, column 3) is where there is stored a serial number which is assigned to credit card 2 during manufacture thereof. The third bit field in zone 2 (words four and five respectively at row 1, column 0 and row 1, column 1) is where a validating character for credit card 2 is located. The validating character in the third bit field having a predetermined combination of binary zeros and ones, is recorded when all attributes of the credit card which enable identification thereof have been ascertained as being correct during the recycling operation or at the time of original manufacture. The validating character stored in the third bit field is stored before delivery of the credit card to the person who carries it. The fourth bit field in zone 1 (words six and seven at row 1, column 2 and row 1, column 3) is where a key character, i.e., invalidating character, is stored. If during utilization of the credit card, the key character in the fourth bit field is modified and no longer corresponds to the key character which was inserted into the fourth bit field at the time of manufacture or during the recycling operation, the recycling apparatus recognizes the altered character as being an invalid character and prevents further utilization of the card. The key character located in the fourth bit field generally is altered during normal utilization only by an unscrupulous card holder who is attempting to alter the changeable data in zone 2. Normally, the data stored in zone 1 is considered as fixed data because it is subject to change only during a recycling operation, unless an overt attempt is made to change the data stored in memory 10 or the memory is subjected to an ambient field that alters the bit patterns stored therein.

The key character located in the fourth bit field preferably includes a predetermined number (N) of predetermined binary bits (1 or 0) out of a total of M bits. For example, in the particular embodiment wherein the key character in the fourth bit field includes 8 bits (M=8), N might be equal to 4. By providing an N among M code in bit field four, it is possible for the recycling apparatus to detect easily if an attempted erasure of zone 2 has occurred since such an erasure attempt results in an alteration of the number of binary ones or zeros in bit field four and the code in field 4 no longer follows the N among M rule. The N among M rule can also be adopted for the validation character stored in bit field three during a recycling operation.

Figure 4:
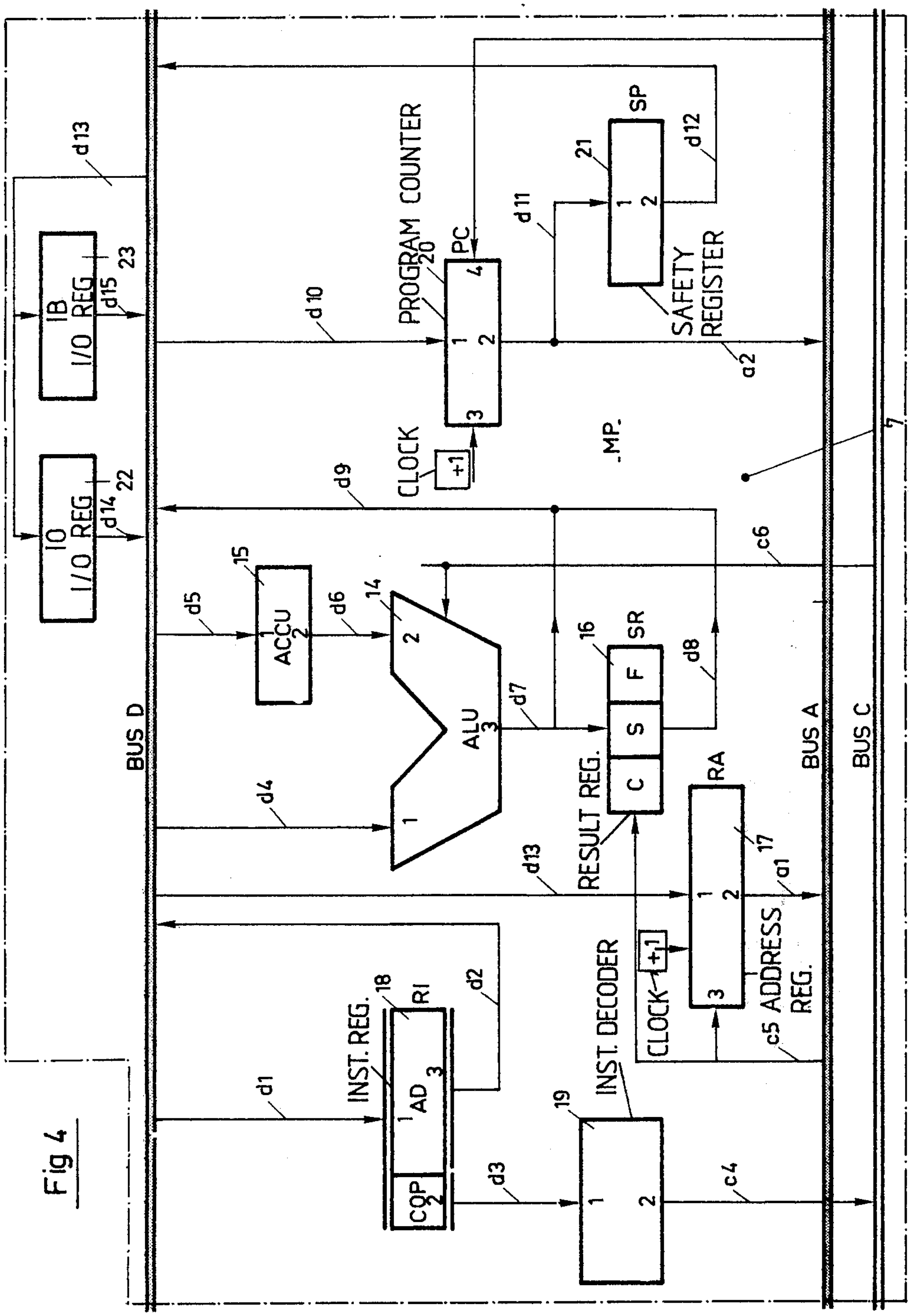
FIG. 4 is a detailed block diagram of a microprocessor employed in the system of FIG. 2.

Reference is now made to FIG. 4 of the drawing wherein there is illustrated a detailed block diagram of microprocessor 7 included within recycling machine 1. Microprocessor 7 constitutes the controller of four signals respectively supplied to disk memory 3, keyboard 5, card reader 6, PROM 8, RAM 9 and card 2; these connections are by way of control bus C. Microprocessor 7 also is coupled to address bus A, in turn connected to address decoder 11 of card 2 and addressing terminals of PROM 8 and RAM 9. Data signals are exchanged between data register 13 of card 2 and microprocessor 7, as well as disk 3, keyboard 5, PROM 8 and RAM 9 by way of bus D.

Microprocessor 7 includes an arithmetic logic unit 14 having a first 16 bit input 1 directly responsive to the signal on data bus D. A second input 2 of arithmetic logic unit 14 is responsive to a 16 bit output signal of accumulator register 15, in turn responsive to a second operand signal derived from data bus D. Arithmetic logic unit 14 includes a multi-bit output supplied back to the input of accumulator register 15 via multi-bit leads d7, d9 and d5, as well as bus D, to operation result storage register SR 16 having three one-bit segments C, F and S. The signals stored in segments C, F and S of operation result register 16 respectively indicate the presence of a carry output of arithmetic logic unit 14, of equality between the inputs of arithmetic logic unit 14 and the polarity of the output of unit 14. The signals stored in operation result register 16 permit branching operations towards subprograms involved in the microprogrammed recycling machine 1. The one bit signals in segments C, F and S are applied to separate leads in data bus D.

Arithmetic logic unit 14 includes a control input, supplied to unit 14 from bus C by way of lead c6; in response to a binary 1 being applied to lead c6, the arithmetic logic unit is enabled. At all other times, arithmetic logic unit 14 is disabled and is unresponsive to signals applied to it. The output of arithmetic logic unit 14 is applied directly to data bus D when operation result register 16 is disabled. Register 16 is only enabled in response to a binary 1 signal applied to it by lead c5, which is a part of control bus C.

Microprocessor 7 also includes an address register RA 17 having an enable input terminal 3, also responsive to the signal on lead c5. Hence, operation result register 16 and address register 17 are both simultaneously enabled. Address register 17 when enabled, includes an input terminal 1 responsive to the 16 bit signal on data bus D. While address register 17 is enabled, it is also periodically incremented in response to clock pulses from clock source 51. Address register 17 includes a 9 bit output which is supplied to leads a1, thence to address bus A.

Microprocessor 7 also includes an intruction register RI 18 having an input terminal 1 responsive to the signal on 16 bit data bus D by way of leads d1. Instruction register RI 18 contains two segments, one for storing instruction operation codes (COP), and the other for addresses of the instruction operation codes. The instruction operation code is supplied as a multi-bit signal from output 2 of register 18 to instruction decoder 19 via multi-bit line d3. Instruction decoder 9, in response to the operation code supplied to it by register 18, supplies the decoded instruction to bus C by way of leads c4. Decoder 19 thus supplies an enabling pulse to one of the leads in bus C at a time, to enable activation of one of the components in microprocessor 7 or one of disk memory 3, keyboard 5, PROM 8, RAM 9 or credit card 2. In addition to enabling these elements, the signal supplied by decoder 19 to bus C commands reading and writing operations for memory 10 of credit card 2.

The address segment of the instruction stored in instruction register 18, derived at output 3 of the register, is supplied via a multi-bit output to data bus D via leads d2.

Microprocessor 7 also includes an ordinal program counter 20 PC which is enabled in response to a binary 1 level applied to input 4 thereof from control bus C. When enabled, program counter 20 is loaded with an initial program count supplied to input 1 thereof by way of leads d10 and data bus D. When program counter 20 is enabled it is also periodically incremented by pulses from clock source 51 which are supplied to input 3 of the program counter. Program counter 20 includes a multi-bit output 2 which is supplied to 9 bit address bus A by way of leads a2 and to safety register 21 by way of lead d11. Safety register 21 is, in effect, an overflow register that stores one bit and indicates that the maximum count of program counter 20 has been reached. Register 21 includes an output 2 which is coupled back to data bus D, to signal that the program counter has reached its maximum count. Programs and microprograms contained in PROM 8, RAM 9 and memory 10 on card 2 can be addressed both by ordinal counter 20 and address register 17, depending upon whether program counter 20 or address register 18 is enabled by instruction decoder 19.

Microprocessor 7 also includes input/output registers IO22 and IB23, each of which includes 16 stages, one for each of the bits of data bus D. Registers 22 and 23, connected to the 16 bits of bus D by way of leads d13, supply signals back to bus D by way of leads d14 and d15, respectively.

Registers 22 and 23 are buffer registers between different elements in the recycling machine and card 2. If an instruction is being transferred from an addressed location of one of memories 8, 9 or 10 into instruction register 18, the transfer is by way of bus D and buffer 20. Buffer 20 is also employed if there is a data transfer from an addressed location of one of memories 8, 9 or 10 to input 1 of arithmetic logic unit 14 or into accumulator register 15. Such transfers occur as a function of the type of instruction employed. Data written into a location of one of memories 8, 9 or 10 in response to addresses supplied to bus A are transferred to data bus D by way of buffer register 23. Bus D is also used to transfer data and information between registers 16, 17, 18 and 21. The address segment of the instruction contained in register 18, as derived from output 3 thereof, can be transferred into input 1 of ordinal counter 20 by way of bus D to supply the ordinal counter with an initial subprogram or microprogram address, as is necessary for execution of the system.

The result of an operation performed on two operands supplied to inputs 1 and 2 of arithmetic logic unit 14 is selectively supplied to any of accumulator register 15, read/write memory RAM 9, memory 10 of credit card 2 by way of register 13 or to register 23 as a part of a transfer into disk memory 3.

The apparatus which has been described in connection with FIGS. 1–4 enables each credit card 2 in a set of credit cards to be recycled. The operations necessary for recycling are transferred from disk memory 3 into RAM 9. Disk 3 contains an index which correlates keys stored in field 1 of zone 1 of memory 10 on card 2 to serial numbers of the cards in circulation. When the recycling apparatus 1 is initialized, data stored on disk 3 (instruction and index data) are transferred via bus 10 into RAM 9. Inputting and outputting of data between disk 3 and RAM 9 are performed in a conventional manner, similar to any conventional data processing system. The type of transfer is described in the book entitled Microprocessors edited by Sybex, 313 rue Lecourbe, 75015 Paris, written by Rodney Zaks et al.

Figure 5:
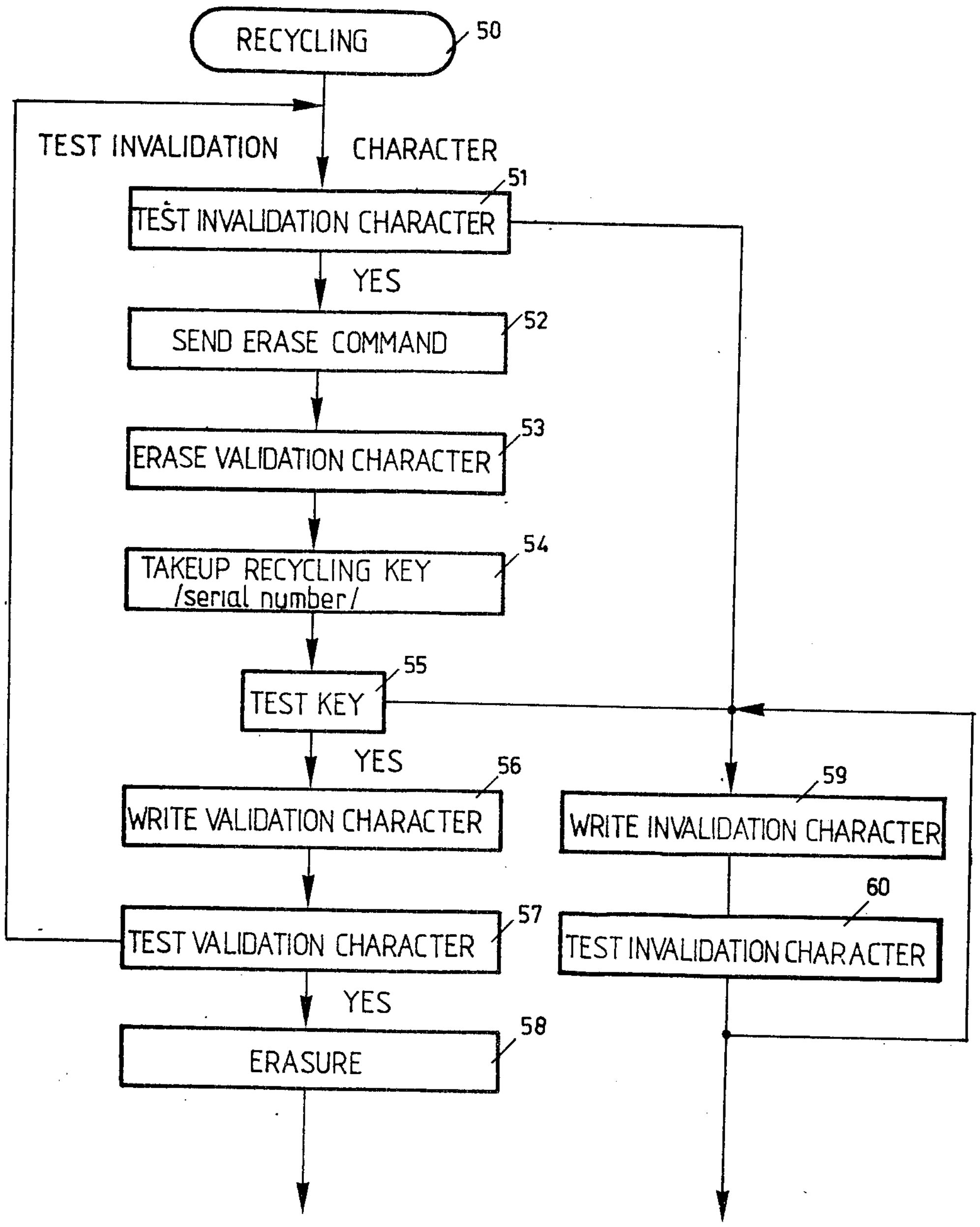
FIG. 5 is a flow diagram of the operations performed by a recycling machine of the type illustrated in FIGS. 1 and 2 and of operations performed on the card and in the card.

When the transfer operations between disk memory 3 and RAM 9 have been completed, a set of credit cards 2 is recycled under the control of a microprogram stored in PROM 8, which is supervised by the signal loaded into RAM 9. A flow chart of the recycling operation is illustrated in FIG. 5. Detailed sequencing of the operations indicated by the flow diagram of FIG. 5, with regard to the transfer of data between the various components illustrated in FIGS. 1–4 is described after the description of FIG. 5.

After the transfer operations have been completed, as indicated by stage 50, FIG. 5, the invalidation character or key stored in bit field four of zone 1 in memory 10 of credit card 2 is tested during operation or stage 51 to determine if it is the same as when it was stored originally, during manufacture or the previous recycling operation. If the test performed during stage 51 indicates that a different invalidation character is stored in the card memory from the invalidation character originally stored in the memory, the card is rendered unusable. If the test during operation 51 indicates that the correct invalidation character is stored in memory 10 on card 2, the microprogram executed by microprocessor 7 advances to stages 52, 53 and 54. During stage 52, an erase command is supplied during operation 52 to the validation character in bit field three zone 1 of memory 10 on card 2. The erase command of operation 52 is followed by an actual erase operation of the validation character in memory 10 on card 2, during operation 53.

After operation 53, the serial number of credit card 2 is read from bit field two in zone 1 of memory 10 on card 2, during operation 54. The card serial number read from bit field two is compared with a sequence of signals derived from disk memory 3, indicative of card serial numbers, during operation 55. If the test performed during operation 55 indicates that the serial number stored in memory 10 of the card being recycled is the same as one of the serial numbers stored in disk 3, the program advances to stage 56. During stage 56, a validation character is written into bit field three zone 1 of memory 10 on the card 2 being recycled. Following stage 56, the program proceeds to stage 57 during which the character written into bit field three in zone 1 of memory 10 on card 2 is read out and tested, thereby enabling a determination to be made that the validation character has been correctly written into space 3 of zone 1. If the validation character has been correctly written into bit field three, the program advances to operation 58, during which the data stored in zone 2 of memory 10 on card 1 are erased, i.e., changed.

If either of the tests performed during stages 51 or 58 is incorrect, i.e., the wrong invalidation character is stored in bit field four, zone 1 of memory 10 of recycle card 2, or the serial number in space 2, zone 1 of memory 10 is not in disk memory 3, card 2 is taken out of service by writing an invalidation character into bit field four during operation 59. All other attempts to recycle card 2 are thereafter unsuccessful because the apparatus of FIGS. 1–4 thereafter detects the invalidation character and prevents performance of operations 52–58. After operation 59 has been performed, the program advances to stage 60, during which the invalidation character written into bit field four, zone 1 of recycled card 2 is tested to determine if the invalidation character was correctly written. If the invalidation character was incorrectly written into bit field four, zone 1 of memory 10 on card 2, the program goes through a DO loop and returns to operation 59. In the invalidation character test during operation 60 indicates that the invalidation character has been correctly written into bit field four, zone 1 of memory 10 on recycled card 2, the program is advanced to an output stage and the card is thereby rendered not available for future use.

If the test of the validation character loaded into bit field three, zone 1 of memory 10 on card 2 during stage 57 indicates that the validation character was incorrectly written, the program is recycled through a DO loop so that operation 51 is again performed. The sequence is again repeated until the test performed during operation 57 indicates that a correct validation character has been written into bit field three, zone 1 of memory 10 on card 2. To avoid a repeated number of unsuccessful attempts to write the validation character into bit field three, zone 1 of memory 10 on card 2, the number of unsuccessful tests during operation 57 can be counted by an apparatus (not shown) and limited to a predetermined number, for example 10.

The symmetry of the operations associated with the normal development of a card during the recycling operation during stages 56 and 57 relative to the development of the operations associated with an error, during stages 59 and 60, renders ineffective attempts at observing signals being transmitted between card 2 and recycling apparatus 1 with a view to prevent location of the invalidation character on the card, and the binary bits associated with the invalidation character.

The operations described in connection with FIG. 5 are initiated by loading register 18 from disk memory 3 via data bus D so the COP and AD segments of instruction register 18 respectively contain an instruction operation code for transfer of the address in register 18 and the address where the microprogram in PROM 8 starts. The address in segment AD of register 18 is transferred to ordinal counter PC via bus D because the counter is enabled in response to a binary 1 level being applied to terminal 4 thereof from control bus C, in turn responsive to an output of instruction decoder 19, which responds to an instruction operation in segment COP of register 18. Ordinal counter 20 is periodically incremented by one unit at a time in response to pulses from clock source 151, from the microprogram start address, to permit execution of microinstructions in the microprogram. The microinstructions are sequentially loaded into instruction register 18 from PROM 8. The microinstructions contain an operation code specifying the type of operation to be performed by the apparatus and an address code specifying the location in the apparatus of data or operands on which a specified operation by the operation code is performed. The initial address for the recycling program read from PROM 8 is assumed to be at PROM address 0000; the addresses in PROM 8 are coded in hexidecimal, so that the decimal numbers 0,1,2,3,4,5,6,7,8,9,10,11,12,13,14,15, are respectively represented as the hexidecimal characters 0,1,2,3,4,5,6,7,8,9,A,B,C,D,E,F.

The list of microinstructions performed by the system in response to incrementing of ordinal counter 20 from the initial state thereof, is as follows:

| State of Microinstruction | Meaning |
|---|---|

20

-continued

| State of Microinstruction | | Meaning |
| --- | --- | --- |
| 0000 (in response to address from 18) | PROM (0000) - RA | The register RA is loaded with the contents of the memory PRØM read at address 0000. The word at row 1, column 2 of memory 10 (ADM = 1, POS=2) is loaded into address register RA from PROM 8 (stage 50) |
| 0001 (in response to clock pulse) | Read M10 at address ADM=1 POS=2 indicated by the contents of RA<br>L = 1 (enable read lead *L*)<br>M → RD | The four bits of the invalidation character corresponding to the address ADM=1, POS 2 in M are transferred into data register RD of card 2. |
| 0002 | PRØM (0002) RA | The register RA is loaded with the contents of the memory PRØM read at address 0002; the bits for ADM=1, POS=3 are loaded into the RA. |
| 0003 | Read M at address indicated by the contents of RA<br>L = 1<br>M → RD | The 4 bits of the invalidation character corresponding to the address ADM=1, POS 3 in M are transferred into the RD. |
| 0004 | 0200 → RA | Load the address 0200 into the register RA. |
| 0005 | RAM → ACCU | The invalidation character contained in the memory RAM at the address 0200 is transferred into the ACCU. |
| 0006 | RD → ACCU | Test invalidation character result in F. (completion of Stage 51) if F = 0. |
| 0007 | If F = 0<br>do PC+1 → PC<br>if F = 1<br>do X → PC | The erasure command is carried out (stage 52).<br>If F = 1, the invalidation character is rewritten (stage 59) into address ADM=1, POS=1, 2 of M |
| 0008 | O → RD | The register RD is reset at zero. |
| 0009 | RD → M<br>ADM=1<br>POS=0 | The zero contents of RD are transferred to M at the address ADM=1, POS=0. |
| 000A | RD → M<br>ADM=1<br>POS=1 | The zero contents of RD are transferred to M at address ADM=1, POS=1 (the recording carrier validation character is reset to zero, completion of stage 53). |
| 000B | M (ADM=0, POS=2) → RD(8,11) | The recording carrier serial number is read and placed in the register RD |
| 000C | M (ADM=0, POS=3) → RD(12,15) | so it occupies RD bit between the positions 8–15 (stage 54) |
| 000D | Load address RAM 0201 into the register RA | The serial numbers (N) are read out from index 3 to increment register RA from RAM address 0201; the numbers are arranged after each reading in accumulator register ACCU. A key is is associated with each serial number. This key is placed in the register ACCU at the same time as the corresponding serial number. |
| 000C | RA : : 0201 + N<br>if RA = 0201 + N<br>do PC + 1 PC<br>if RA = 0201 + N<br>do X → PC | |
| 000D | Read RAM at address contained in RA<br>RAM → ACCU | |
| 000E | ACCU : : RD, result in F | (compare ACCU with RD) |
| 000F | if F = 0 do<br>RA + 1 → RA<br>000C → PC<br>if F = 1 do<br>PC + 1 → PC | |
| 0010 | Read M at address | The key of the memory M |

-continued

| | State of Microinstruction | Meaning |
|---|---|---|
| | ADM=1, POS 2<br>M → RD | is transferred into the register RD. |
| 0011 | Read M at address<br>ADM=1, POS : 3<br>M → RD | |
| 0012 | RD : : ACCU<br>Result in F | The key number contained in the register RD is composed of key number contained in the accumulator register. If the comparison is negative, continue to the address Z. If the comparison is positive, writing of the validation character can start (completion of stage 55). |
| 0013 | if F = 0<br>do Z → PC<br>if F = 1<br>do PC + 1 → PC | |
| 0014 | 0201 + (N+1) → RA | The validation character is read in RAM and transferred into RD, ACCU and M. |
| 0015 | RAM → RD | |
| 0016 | RD → ACCU | |
| 0017 | RD → M<br>ADM=1<br>POS=0 | |
| 0018 | RD → M<br>ADM=1<br>POS=1 | |
| 0019 | M → RD (0, 3)<br>ADM=1<br>POS=0 | The validation character which has just been written is transferred into RD (completion of stage 56). |
| 001A | M → RD (4, 7)<br>ADM=1<br>POS=1 | |
| 001B | ACCU : : RD<br>result in F<br>if F = 0 do<br>0000 → PC<br>if F = 1<br>do PC + 1 → PC | Comparison of the validation character written in the recording carrier with the validation character from the memory RAM is recorded in the register ACCU. |
| 001C | 0 → RD | The register RD is reset at zero (stage 57). |
| 001D | RD → M<br>ADM=2<br>POS=0 | Erasure of the successive memory locations of the address ADM=2 POS=0 to ADM=75 POS=31 (stage 58). |
| 013B | RD → M<br>ADM=1<br>POS=3 | |
| 013C | END | |
| X | ACCU → RD | The invalidation character is loaded into the register RD then written in the memory M (stage 59). |
| X = 1 | RD → M<br>ADM=1<br>POS=0 | |
| X + 2 | RD → M<br>ADM=1<br>POS=1 | |
| X + 3 | M → RD<br>ADM=1<br>POS=0 | |
| X + 4 | M → RD<br>ADM=1<br>POS=1 | |
| X + 5 | RD : : ACCU<br>Result F | The invalidation character which has just been described is tested (stage 60). |
| X + 6 | if F = 1<br>PC + 1 → PC<br>if F = 0<br>X → PC | |
| X + 7 | END | |

Figure 6:
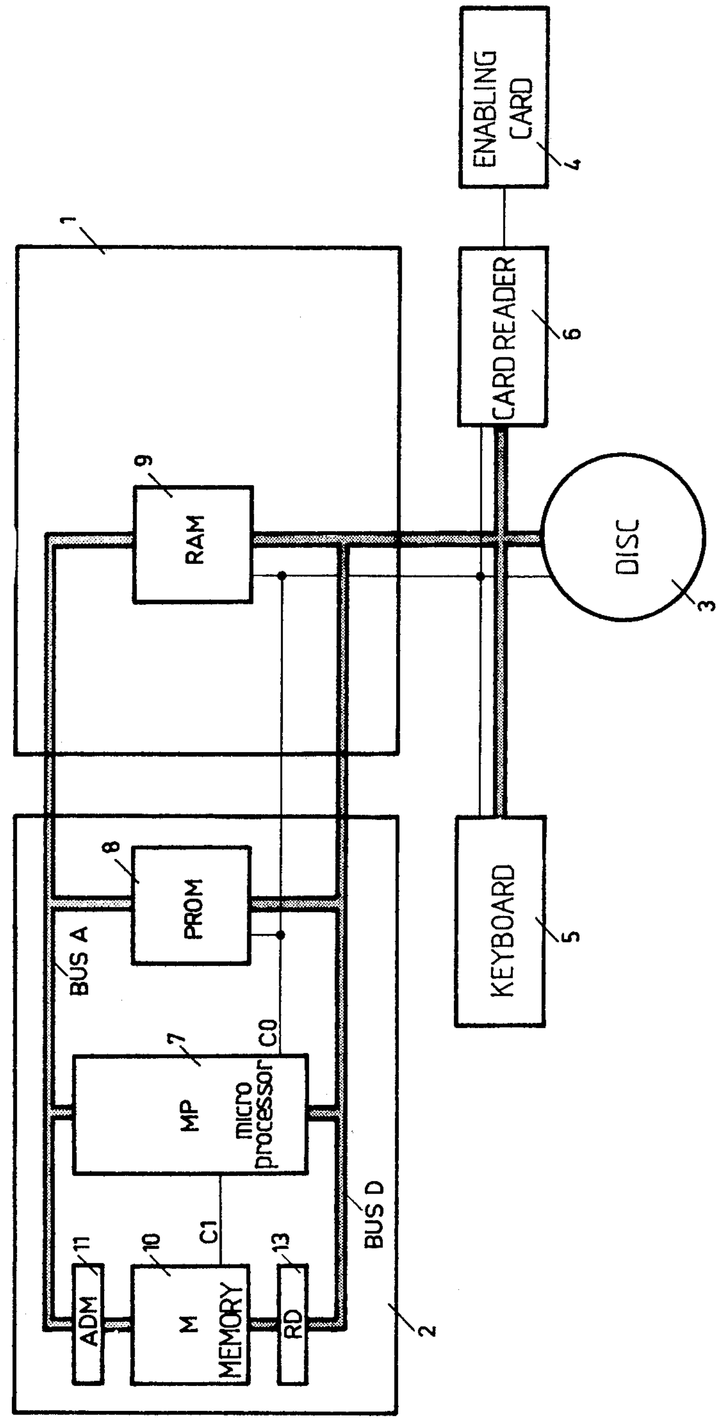
FIG. 6 is a detailed block diagram of an alternate embodiment of the invention wherein elements for controlling recycling are positioned on the credit card.

FIG. 6 is a block diagram of a modification of the embodiment of the recycling machine illustrated in FIG. 1. In the embodiment of FIG. 6, the control elements of the recycling apparatus are included on credit card 2. In the FIG. 6 embodiment, microprocessor 7 PROM 8 and data memory 10 are all incorporated on credit card 2. In this way, the control means of memory 10 is integrated in circuit card 2. Preferably, the electronic elements incorporated in card 2 are provided by a monolithic structure, to make it impossible to test signals transmitted between memory 10, microprocessor 7 and PROM 8.

In the embodiment of FIG. 6, recycling machine 1 is formed mainly by RAM 9 and elements (not shown) necessary for establishing connections between card 2, keyboard 5, disk 3 and card reader 6 which is responsive to enabling card 4.

While there have been described and illustrated specific embodiments of the invention, it will be clear that variations in the details of the embodiments specifically illustrated and described may be made without departing from the true spirit and scope of the invention as defined in the appended claims.

We claim:

1. A method of changing variable data stored in a credit card memory having first and second zones, the first zone including: a first fixed serial number bit field, a card validating/invalidating character field subject to change to an invalidating state, and initially having a state different from the invalidating state, and a key character field containing data unknown to the person carrying the card, the key character controlling change of data stored in the second zone, the data in the second zone being subject to change to enable re-use of the credit card, the method comprising reading each of said fields, comparing the second field with a predetermined value for the second field, in response to the comparing step indicating that the second read field is an invalid character preventing change of the data in the second zone to data associated with re-use of the credit card, comparing the serial number read from the first field with a set of serial numbers for credit cards, comparing the key character with a predetermined value therefor correlated with the card serial number, in response to the second field comparing step indicating that the second read field is not an invalid character and in response the first field comparing step indicating that the read serial number is in the set of assigned serial numbers and in response to the third field comparing step indicating that the key character has the predetermined value therefor changing the data in the second zone to data associated with re-use of the card.

2. The method of claim 1 further including writing an invalidating character into the second field in response to the key character not being equal to the predetermined value.

3. The method of claim 1 or 2 further including supplying the data associated with re-use to the second zone only in response to an operator inserting an enabling card into a machine for enabling changing of the data associated with re-use.

4. The method of claim 1 or 2 wherein each of the comparing steps is performed at a machine different from a machine for reading the fields.

5. A method of recycling credit cards so that they may be reused when a variable data memory zone thereof is filled, the memory of each card including a fixed data zone containing: a serial number field, validation/invalidation character field subject to change to an invalidation state from an initial validation state, and a key character field having a value correlated with the serial numbers for the card and unknown to a person carrying the card, the method comprising reading the serial number, validation/invalidation and key character fields, comparing the read serial number field with serial numbers of a set of serial number fields, the card if valid being one member of the set, comparing the read validation/invalidation field with a predetermined value for the card, and comparing the read key character field with a key character for the read serial number, in response to the validation/invalidation field comparing step indicating that the card is invalid preventing erasure of the filled variable data memory zone to thereby prevent recycling of the card, in response to the comparing steps indicating that the validation/invalidation field is a validation field and the read serial number is one of the serial numbers of the set and the key character is the key character for the card having the read serial number erasing the filled variable data memory zone to provide recycling of the card.

6. The method of claim 5 further including writing an invalidating character into the validation/invalidation field in response to the key character not being equal to the predetermined value.

7. The method of claim 5 or claim 6 further including rewriting a validation character into the validation/invalidation field in response to the comparing steps indicating that the validation/invalidation field is a validation field and the read serial number is one of the serial numbers of the set and the key character is the key character for the card having the read serial number.

8. The method of claim 7 further including testing the rewritten validation character to determine if it was correctly written, and performing the erasing step only in response to the testing step indicating the rewritten validation character being correctly written.

9. The method of claim 7 further including testing the rewritten validation character to determine if it was correctly written, performing the erasing step only in response to the testing step indicating the rewritten validation character being correctly written, and in response to the testing step indicating the rewritten character being incorrectly written, repeating the comparing steps.

* * * * *

UNITED STATES PATENT AND TRADEMARK OFFICE

CERTIFICATE OF CORRECTION

PATENT NO. : 4,442,345

DATED : April 10, 1984

INVENTOR(S) : Jean H. MOLLIER and Michel UGON

It is certified that error appears in the above-identified patent and that said Letters Patent is hereby corrected as shown below: On the title page

[63] Continuation of Ser. No. 326,523, Dec. 2, 1981, which is a continuation of Ser. No. 143,808, Apr. 23, 1980, abandoned.

Signed and Sealed this

*Fourteenth* Day of *August 1984*

[SEAL]

*Attest:*

GERALD J. MOSSINGHOFF

*Attesting Officer* *Commissioner of Patents and Trademarks*